United States Patent
Best et al.

(10) Patent No.: US 9,970,458 B2
(45) Date of Patent: May 15, 2018

(54) WALL RING WITH WALL RING HEATING ELEMENT FOR AXIAL FANS

(71) Applicant: EBM-PAPST MULFINGEN GMBH & CO. KG, Mulfingen (DE)

(72) Inventors: Dieter Best, Ingelfingen (DE); Othmar Ströbel, Schrozberg (DE); Stefanie Wolfarth, Niederstetten (DE)

(73) Assignee: EBM-PAPST MULFINGEN GmbH & Co. KG (DE)

( * ) Notice: Subject to any disclaimer, the term of this patent is extended or adjusted under 35 U.S.C. 154(b) by 377 days.

(21) Appl. No.: 14/430,476

(22) PCT Filed: Sep. 4, 2013

(86) PCT No.: PCT/EP2013/068271
§ 371 (c)(1),
(2) Date: Jul. 23, 2015

(87) PCT Pub. No.: WO2014/056662
PCT Pub. Date: Apr. 17, 2014

(65) Prior Publication Data
US 2015/0345509 A1    Dec. 3, 2015

(30) Foreign Application Priority Data

Oct. 8, 2012    (DE) .................. 10 2012 109 544

(51) Int. Cl.
*F04D 29/58*    (2006.01)
*F04D 29/52*    (2006.01)
*F04D 19/00*    (2006.01)

(52) U.S. Cl.
CPC ......... *F04D 29/582* (2013.01); *F04D 19/002* (2013.01); *F04D 29/522* (2013.01);
(Continued)

(58) Field of Classification Search
CPC ............. F04D 29/52258; F04D 29/582; F04D 29/584; F04D 29/5853; F04D 29/5893; F04D 29/4226
See application file for complete search history.

(56) References Cited

U.S. PATENT DOCUMENTS

| | | | |
|---|---|---|---|
| 2,740,579 A | * | 4/1956 | Welsh .................. F04D 29/646 126/110 B |
| 3,103,796 A | * | 9/1963 | Dickson ................ A47F 3/0447 62/199 |

(Continued)

FOREIGN PATENT DOCUMENTS

| | | | | |
|---|---|---|---|---|
| DE | 4118057 A1 | * | 12/1992 | ......... F04D 29/5893 |
| DE | 202009002954 U1 | * | 5/2009 | ............ F16L 59/025 |

(Continued)

OTHER PUBLICATIONS

International Search Report for corresponding PCT/EP2013/068271 filed Sep. 4, 2013, completed Dec. 13, 2013 by Peter Ingelbrecht of the EPO.

*Primary Examiner* — Ninh H Nguyen
*Assistant Examiner* — Topaz L Elliott
(74) *Attorney, Agent, or Firm* — Tarolli, Sundheim, Covell & Tummino LLP

(57) ABSTRACT

The invention relates to a wall ring for receiving an axial fan in particular, comprising an annular body with a central longitudinal axis, a flow inlet opening, a flow outlet opening, and an electric heating element in particular, said heating element being arranged on at least some sections of the circumference of the annular body. A profiled covering section made of a thermally insulating material is removably fixed to an outer surface of the annular body at least in some sections of the circumference, said profiled covering section together with the annular body forming a receiving area in (Continued)

Figure 1:
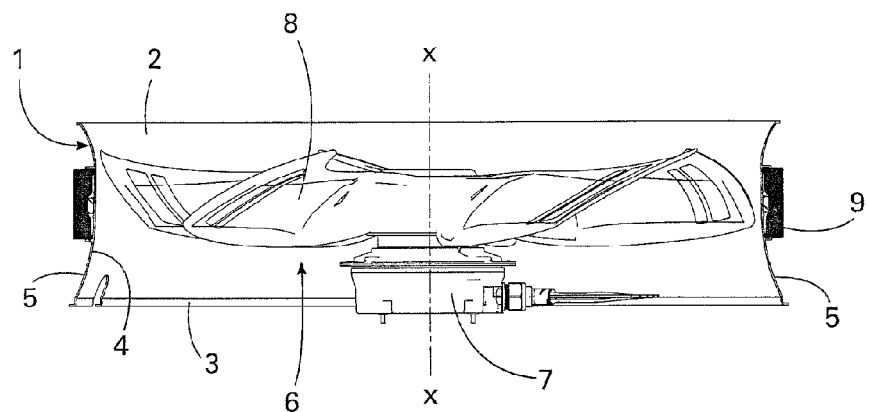

the region of the annular wall of the annular body in order to receive the electric heating element.

9 Claims, 3 Drawing Sheets

(52) U.S. Cl.
CPC ....... *F04D 29/584* (2013.01); *F04D 29/5853* (2013.01); *F05D 2260/231* (2013.01); *F05D 2300/612* (2013.01)

(56) References Cited

U.S. PATENT DOCUMENTS

| | | | | |
|---|---|---|---|---|
| 4,146,776 | A * | 3/1979 | Johansen | F24H 3/0411 165/125 |
| 5,294,049 | A * | 3/1994 | Trunkle | E04B 1/0007 236/49.5 |
| 6,454,527 | B2 * | 9/2002 | Nishiyama | F01P 11/12 264/51 |
| 6,736,598 | B2 * | 5/2004 | Kleemann | A47L 15/4225 219/543 |
| 7,168,917 | B2 * | 1/2007 | Bronaugh | F24H 3/0405 415/177 |
| 7,819,563 | B2 * | 10/2010 | Hardgrave | F04D 25/088 362/294 |
| 9,193,466 | B2 * | 11/2015 | Calder | B64D 15/12 |
| 2002/0048513 | A1 | 4/2002 | Martin | |
| 2009/0220334 | A1 * | 9/2009 | Vouche | F04D 29/664 415/119 |
| 2013/0051999 | A1 * | 2/2013 | Wenger | F04D 25/08 415/200 |

FOREIGN PATENT DOCUMENTS

| | | | | |
|---|---|---|---|---|
| DE | 102009049628 | A1 * | 5/2010 | ............. F04D 29/58 |
| DE | 102012218286 | A1 * | 4/2014 | ......... F04D 29/4226 |
| EP | 1 363 383 | A2 | 11/2003 | |
| FR | 2943717 | A1 * | 10/2010 | ............ F01D 11/025 |

* cited by examiner

WALL RING WITH WALL RING HEATING ELEMENT FOR AXIAL FANS

RELATED APPLICATIONS

The present invention is a U.S. National Stage under 35 USC 371 patent application, claiming priority to Serial No. PCT/EP2013/068271, filed on 4 Sep. 2013; which claims priority from DE 102012109544.2, filed 8 Oct. 2012, the entirety of both of which are incorporated herein by reference.

The present invention relates to a wall ring for receiving, in particular, an axial fan, comprising an annular body having a central longitudinal axis, with a flow inlet opening and a flow outlet opening, and in particular, said wall ring comprising an electric heating element that is arranged at least over part of the circumference of the annular body.

Axial fans are used, among other things, for applications at very low temperatures. Here, there is a risk that ice will form and thus that the fan wheel blade will freeze onto the wall ring. Typical applications in which this risk exists include heat pumps, evaporators in cold-storage rooms and the like. In order to prevent such a freezing from occurring, it is a known procedure to install a heating element in the form of an electric resistance heater on the wall ring and to use it as a heater. A drawback here is the great amount of energy that has to be supplied in order to heat the wall ring all the way through so as to prevent ice formation on the inside of the wall ring or else to melt off any ice that might have formed there. Here, a high heat release to the surroundings takes place and the heat that enters into the cold-storage room in this manner has to be subsequently removed once again from the cold-storage room. As a result, such a wall ring heater is not energy-efficient.

The present invention is based on the objective of avoiding the above-mentioned disadvantages and reducing the formation of ice on the inside of the wall ring.

This is achieved according to the invention in that a covering profile made of a thermally insulating material is removably affixed to the outside of the annular body, at least over part of the circumference, said covering profile—together with the annular body—enclosing a receiving space for the electric heating element. Since the electric heating element—which is preferably configured as a heating tape—is installed in an air chamber between the wall ring and the outer, thermally insulating covering profile, a thorough distribution of the heat over the wall ring is achieved. Here, thanks to the outer insulating covering profile, the heat losses that occur are small. In this context, especially a covering profile made of foamed plastic is advantageous. Consequently, according to the invention, the heat is generated where it is actually needed and it prevents ice formation between the axial blades of the axial fan and the wall ring. Since the covering profile is removably affixed, the heating tape can also be put in place at a later point in time. Here, the outer covering profile prevents a high heat release to the surroundings from occurring, so that the wall ring is heated energy-efficiently since the amount of heat that enters the cold-storage room is considerably reduced by the outer, thermally insulating covering profile.

Moreover, it is advantageous according to the invention if, on the outside of the annular body, there are two axially spaced holding ribs which run around the circumference and between which the heating element—especially configured as a heating tape—is arranged. This ensures a precise fixation of the position of the heating element on the annular body.

Furthermore, it is advantageous according to the invention if the covering profile consists of at least two, preferably four, circular arc-shaped covering sections that are removably joined to each other so as to form a circular annular covering profile, and also joined to the annular body. This segmenting according to the invention permits a simpler installation of the covering profile according to the invention.

Figure 2:
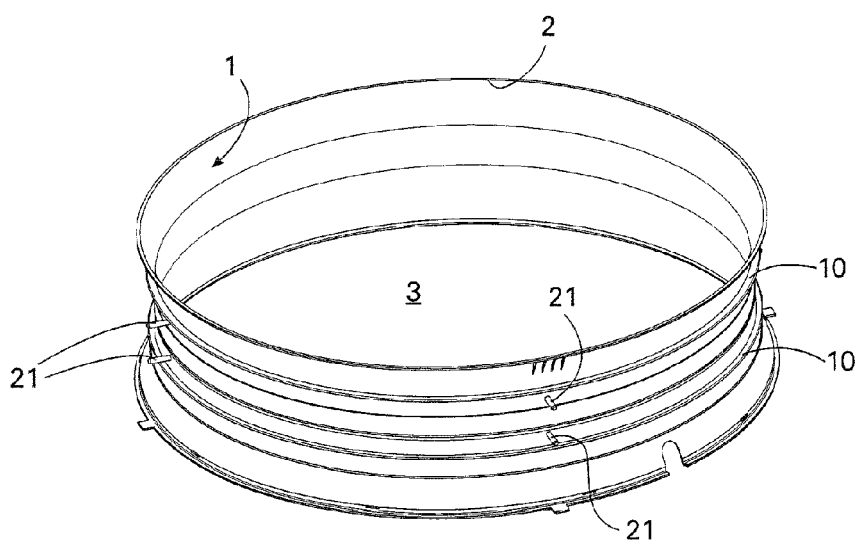
Figure 3:
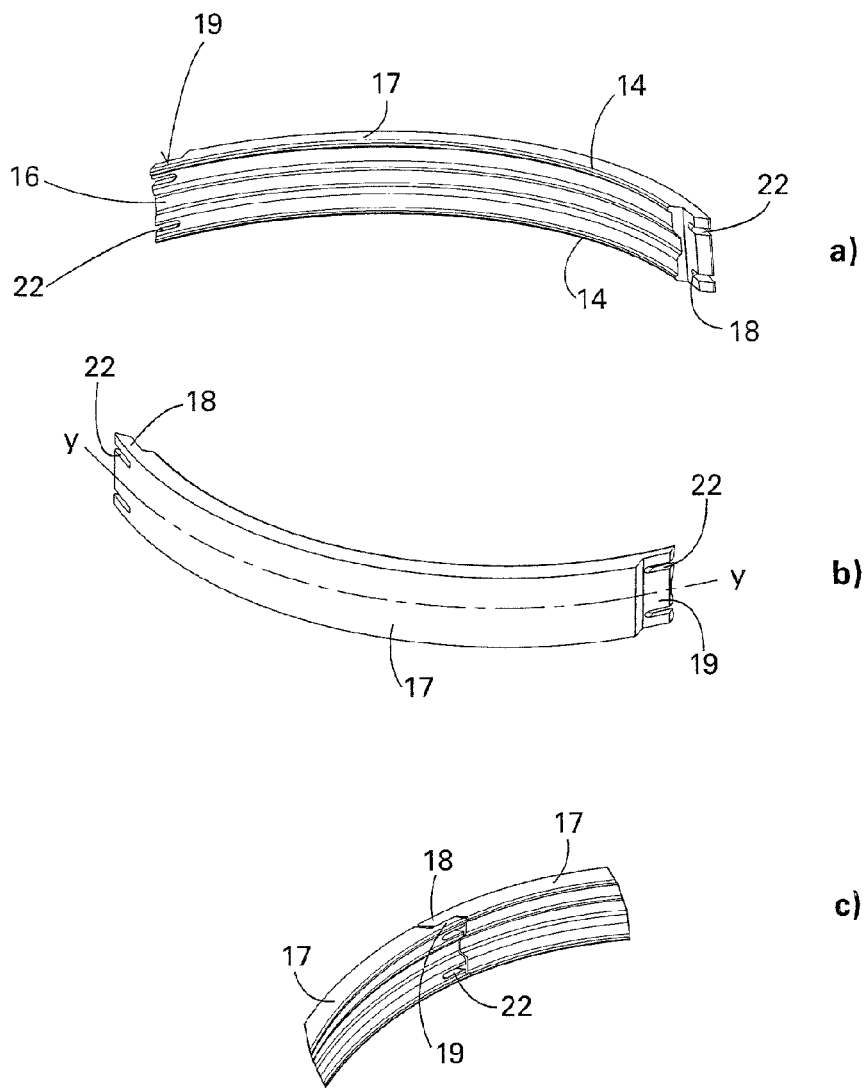
Figure 4:
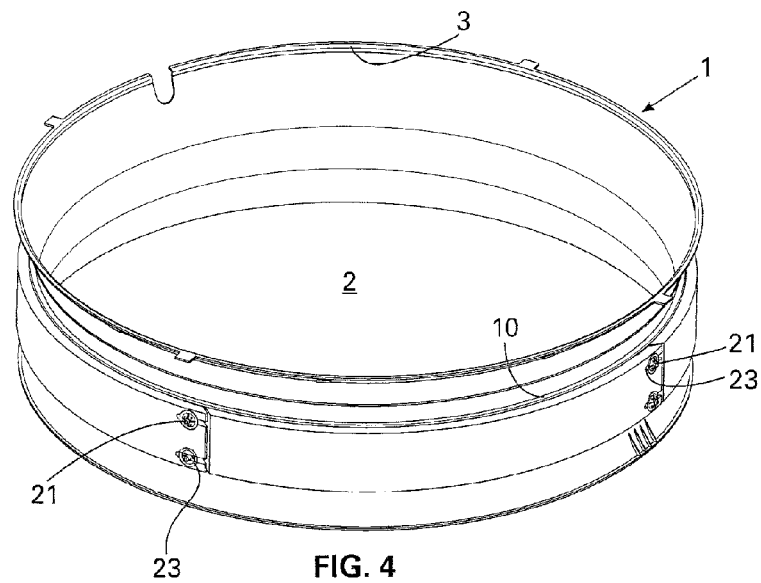
Figure 5:
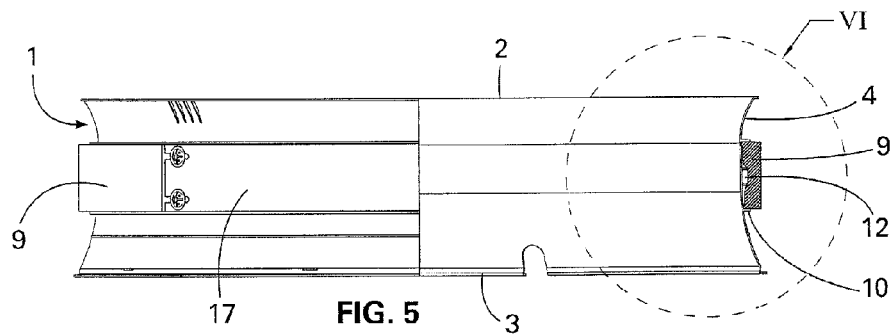
Figure 6:
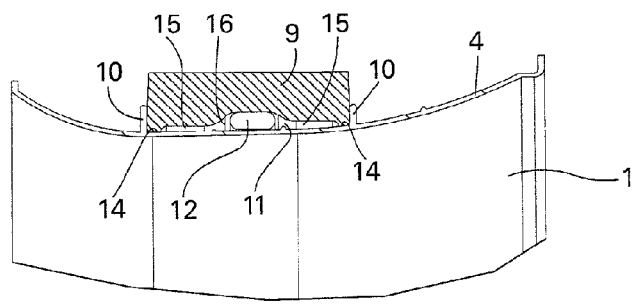

Additional advantageous embodiments of the invention are contained in the subordinate claims and are explained in greater detail with reference to the embodiment shown in the accompanying drawings. The following is shown:

FIG. 1 a cross section through a wall ring according to the invention, with an installed axial fan, FIG. 2 a perspective side view of a wall ring according to the invention, without a covering profile, FIGS. 3a, 3b various perspective views of a covering section according to the invention, FIG. 3c a perspective partial view of two joined covering sections according to FIGS. 3a, 3b, FIG. 4 a perspective side view of a wall ring according to the invention, with an installed covering profile, FIG. 5 a side view of the wall ring according to FIG. 4, partially cut-away, and FIG. 6 a detail of VI in FIG. 5.

In FIGS. 1 to 6, the same parts or functionally equivalent parts are always designated with the same reference numerals. Even if certain features of the wall ring according to the invention or of its components that have been described and/or that can be derived from the drawings are only described in conjunction with one embodiment, the features are nevertheless also essential according to the invention, irrespective of said embodiment, either as an individual feature or else in combination with other features of the embodiment, and are construed as belonging to the invention.

As shown in the figures, a wall ring according to the invention consists of an annular body 1 having a central longitudinal axis X-X, with a flow inlet opening 2 and with a flow outlet opening 3. The annular body 1 according to the invention has a ring wall 4 that is situated between the two openings 2, 3 and that has a circular cross section that is perpendicular relative to the central axis X-X. In the embodiment shown, there is an axial fan 6 inside the wall ring according to the invention. This axial fan 6 consists of an electric motor 7, which is arranged centrally in the central longitudinal axis X-X and to which an impeller 8 is connected. The annular body 1 according to the invention is especially made of plastic. The annular body 1 especially has a circular cross section in a plane that is perpendicular to the longitudinal axis X-X. The ring wall 4 has a convexly curved contour so that the diameter of the openings 2, 3 is larger than the diameter of the annular body 1 in the middle between said openings.

The outside 5 of the ring wall of the annular body 1 has a covering profile 9 that is made of a thermally insulating material, especially plastic, and that is removably attached to the annular body 1. This covering profile 9 circumferentially surrounds the annular body 1. However, it also falls within the scope of the invention for the covering profile 9 to be arranged only on a part of the circumference of the annular body 1. The covering profile 9—together with the annular body 1—encloses a receiving space 11 in which the electric heating element 12 is arranged. In the embodiment shown, the electric heating element 12 is configured as a tape and the receiving space 11 forms an air chamber between the annular body 1 and the covering profile 9, as a result of which the heat generated by the heating element 12 is distributed uniformly over the wall ring. In particular, a foamed plastic is used as the plastic material for the covering profile 9. The thickness of the covering profile 9 is dimensioned in such a way as to attain a maximum shielding of the heat generated by the heating element 12, so that little heat is radiated towards the outside and the entire heat input goes into the wall ring itself. As can be seen especially in FIG. 6, the electric heating element 12, which can be an electric resistance element, is affixed by the covering profile 9 and by the annular body 1, and the receiving space 11 is configured in such a way that an air gap 15 is formed on both sides of the electric heating element 12 towards the two circumferential side edges of the covering profile 9, and this air gap 15 is closed off at each end by annular projections 14 on the covering profile 9. Via these annular projections 14, the covering profile 9 is in contact with the outside of the ring wall 4. As a result of the air gaps 15 formed on both sides of the electric heating element 12, heat is transferred to the ring wall 4 over a very large area. Moreover, it can be seen especially clearly in FIGS. 1 and 6 that, on the outside, that is to say, on the side of the ring wall 4 or of the annular body 1 facing the covering profile 9, there are two circumferential holding ribs 10 which are at a space from each other in the axial direction, perpendicular to the outside, and between which the covering profile 9 is affixed.

In order to receive the electric heating element 12, the covering profile 9 has a circumferential recess 16 in the middle on its inside facing the ring wall 4. The depth of the recess 16 is adapted to the dimensions of the electric heating element 12 and is dimensioned in such a way that, when the covering profile 9 is put in place by means of its annular projections 14, the electric heating element 12 is held between the covering profile 9 and the ring wall 4, making contact with each of them.

The covering profile 9 according to the invention advantageously consists of at least two, preferably four, circular arc-shaped covering sections 17 that are removably joined to each other—thus forming the circular annular covering profile 9 according to the invention—as well as to the annular body 1, likewise removably. The ends of the covering sections 17 each have an especially stepped profile 18, 19, whereby one end of the stepped profile 18 has the negative shape of the stepped profile 19 at the other end, so that, in the installed state, the covering sections 17, which are joined to each other, overlap in the area of their stepped profiles 18, 19, see FIG. 3c. The height of the stepped profile 18, 19 equals half the height of the covering section 17, so that, in the installed state, the covering sections 17 are flush with each other in their joining area. On their outsides, the covering sections 17 or the covering profile 9 are advantageously configured with smooth walls. In the area between the holding ribs 10, the outside of the annular body 1 advantageously has fixation pins 21 which run perpendicular to the outside and onto which the circular arc-shaped covering sections 17 can be slid through installation openings 22. These installation openings 22 are preferably configured as slits that have an open edge on one side and that run in the lengthwise direction Y-Y of the covering sections 17 in the area of the stepped profiles 18, 19. The slit-like installation openings 22 are suitable, on the one hand, to compensate for manufacturing tolerances and, on the other hand, to compensate for thermal expansions between the annular body 1 and the covering profile 9 due to different material properties. Clamping discs 23 that are slid onto the ends of the fixation pins 21 serve to affix the covering profile 9 or the covering sections 17 onto the fixation pins 21, said clamping discs 23 having a centered star-shaped opening which is delimited by several resilient tabs that extend radially inwards and whose free ends are situated on an inner circle of the disc, whereby the diameter of the inner circle of the disc is smaller than the outer diameter of the fixation pins 21. As a result, the clamping discs 23 are non-positively secured to the fixation pins 21. The clamping discs 23 are advantageously made of resilient material, especially of rust-proof metal, for example, hardened spring steel.

The wall ring according to the invention with the outer covering element—whereby, between these two parts, there is an electric heating element 12 that is enclosed in a receiving space 11—reduces the tendency to ice formation in fans that are installed in cooling equipment and evaporators; it also considerably reduces the heat that enters the heat exchanger, and ice formation can be prevented. This translates into simple installation and dismantling. It is also possible to use a wall ring according to the invention consisting of the annular body 1 and of the covering profile 9 without an incorporated electric heating element 12, whereby the air chamber that is present can already achieve an insulating effect between these two parts.

The invention is not limited to the embodiments shown and described, but rather, it encompasses all embodiments that have the same effect as set forth in the invention. Moreover, the invention is not yet limited to the feature combinations defined in the claims, but rather, it can also be defined by any other desired combination of certain features from among all of the individual features altogether disclosed. This means that fundamentally speaking, practically any individual feature of the independent claims can be left out or replaced by at least one individual feature disclosed in another place in the application.

LIST OF REFERENCE NUMERALS

1 annular body
2 flow inlet opening
3 flow outlet opening
4 ring wall
5 ring wall, outside
6 axial fan
7 electric motor
8 impeller
9 covering profile
10 holding ribs
11 receiving space
12 electric heating element
14 annular projections
15 air gap
16 circumferential recess
17 covering sections
18 stepped profile
19 stepped profile
21 fixation pins
22 installation openings
23 clamping discs
X-X central longitudinal axis
Y-Y lengthwise direction

The invention claimed is:

1. A wall ring for receiving, in particular, an axial fan, comprising an annular body having a central longitudinal axis, with a flow inlet opening and a flow outlet opening, and in particular, said wall ring comprising an electric heating element that is arranged at least over part of the circumference of the annular body, whereby a covering profile made of a thermally insulating material is removably affixed to the outside of the annular body, at least over part of the circumference, said covering profile—together with the annular body in the area of its ring wall—enclosing a receiving space for the electric heating element characterized in that the covering profile is made of a foamed plastic material and whereby the covering profile consists of at least two circular arc-shaped covering sections that are removably joined to each other so as to form the circular annular covering profile and that can be joined to the annular body.

2. The wall ring according to claim 1, characterized in that, on the outside of the annular body, there are two circumferential holding ribs which are at a space from each other in the direction of the longitudinal axis, and between which the covering profile is laterally affixed.

3. The wall ring according to claim 2, characterized in that, in the area between the holding ribs, the outside of the annular body has fixation pins which protrude perpendicular thereto and onto which the circular arc-shaped covering sections can be slid through installation openings.

4. The wall ring according to claim 3, characterized in that the installation opening is configured as a slit that has an open edge and that runs in the lengthwise direction of the covering sections in the area of the stepped profiles.

5. The wall ring according to claim 3, characterized in that, when the covering sections are in the state in which they have been slid onto the fixation pins, they are attached by means of clamping discs that have been slid onto the fixation pins.

6. The wall ring according to claim 5, characterized in that the clamping discs have an annular configuration, whereby they have a centered star-shaped opening which is delimited by several resilient tabs that extend radially inwards and whose free ends are situated on an inner circle of the disc, whereby the diameter of the inner circle of the disc is smaller than the outer diameter of the fixation pins.

7. The wall ring according to claim 1, characterized in that the annular body is made of plastic.

8. The wall ring according to claim 1, characterized in that the annular body has a circular cross section in a plane that is perpendicular to the longitudinal axis, and its ring wall especially is convexly curved.

9. The wall ring according to claim 1, characterized in that the ends of the covering sections each have a stepped profile, whereby one end of the stepped profile has the negative shape of the stepped profile at the other end, so that, in the installed state, an overlapping exists in the area of the stepped profiles.

\* \* \* \* \*